United States Patent [19]

Quackenbush

[11] 3,989,405

[45] Nov. 2, 1976

[54] TOOL FEEDING DEVICE HAVING SIGNAL CONTROL FEED CLUTCH

[76] Inventor: Robert C. Quackenbush, 1330 Beaudry Blvd., Glendale, Calif. 91208

[22] Filed: Mar. 3, 1975

[21] Appl. No.: 555,080

[52] U.S. Cl. .................................. 408/11; 408/10; 408/12; 408/132
[51] Int. Cl.² ........................................ B23B 39/04
[58] Field of Search ............... 408/10, 11, 124, 129, 408/132, 7, 13, 12; 74/841; 173/146

[56] References Cited
UNITED STATES PATENTS

| | | | |
|---|---|---|---|
| 1,950,509 | 3/1934 | Melling | 408/10 |
| 2,418,220 | 4/1947 | Churchill | 408/11 |

*Primary Examiner*—Leon Gilden
*Attorney, Agent, or Firm*—Mahoney, Schick & Cislo

[57] ABSTRACT

A tool spindle is rotatably driven by a drive motor with the spindle being mounted axially movable in a feed and retraction stroke. The drive motor also rotates a lead screw through a drive train with the lead screw moving the spindle in the feed stroke upon engagement of nuts therewith and permitting spring retraction of the spindle in the retraction stroke when the nuts are disengaged therefrom. A clutch in the drive train transmits a normal rotational force therethrough to the lead screw during a normal tool feed stroke, but disengages and interrupts normal rotational forces therethrough upon an abnormal resistance to the normal tool feed stroke reacting reversely through the lead screw to the clutch. Such abnormal resistance to the tool feed stroke could result from a selectively preset stop or an unforeseen obstruction or a tool dulled beyond proper use. Furthermore, upon disengagement, the clutch automatically actuates a valve disengaging the nuts from the lead screw and permitting spring retraction of the tool spindle in its retraction stroke.

16 Claims, 11 Drawing Figures

TOOL FEEDING DEVICE HAVING SIGNAL CONTROL FEED CLUTCH

BACKGROUND OF THE INVENTION

This invention relates to a tool feeding device incorporating a signal controlling feed clutch which clutch is situated transmitting normal rotational forces to the tool feeding mechanism in its feed stroke, but which clutch automatically disengages and interrupts the tool feed stroke while simultaneously providing a signal usable for a coordinated control action upon the tool encountering abnormal resistance to its feed stroke movement. The abnormal resistance to the tool feed stroke may be created from various causes, for instance, a deliberately preset feed stroke limiting stop intended to determine the length of the feed stroke, or an unforeseen obstruction encountered by the tool and spindle at any location during the feed stroke, or even a prohibitively dulling tool becoming incapable of properly carrying out a cutting or drilling intended function. Furthermore, the signal created by the clutch disengagement may be used for various coordinated control purposes such as automatically through cooperable mechanism reversing the tool spindle feed stroke and at least permitting a commencement of and carrying out the tool spindle retraction stroke.

Tools of the type herein involved have previously been provided with feeding mechanisms incorporating clutches for protecting both the feeding mechanism and the tool and spindle upon the tool or spindle encountering an unforeseen obstruction during the feed stroke. For instance, such a prior tool may incorporate a drive motor operably connected providing rotational motion to the tool spindle and tool, and also operably connected providing rotational motion through an overload clutch to a lead screw and nut arrangement. The spindle is arranged for axial movement during rotation thereof in feed and reverse retraction strokes, and the lead screw is connected independently rotatable relative to the spindle but capable of carrying the spindle axially in its feed stroke. Thus, at the commencement of a spindle feed stroke, the lead screw is engaged by the nuts and rotation of the lead screw relative to the nuts drives the independently rotating spindle in its feed stroke, after which, the nuts are released from the lead screw and the spindle may be returned in its retraction stroke merely through spring urging or any other appropriate retraction stroke force.

In these prior tool feeding devices, control of the lead screw and nut engagement and disengagement has been accomplished through movable cams actionable against the nuts through exteriorly accessible control sleeves and the like. With the spindle retracted and ready for the feed stroke, the exterior sleeve is manually manipulated to actuate the cams moving the nuts into engagement with the lead screw commencing and ultimately carrying out the intended spindle feed stroke. Upon completion of the intended spindle feed stroke, engagement of the spindle with a preset stop arrangement operably connected to the sleeve causes the cams to release the nuts into disengagement from the lead screw thereby permitting the following spindle retraction stroke.

The sole purpose of the overload clutch in the rotatable connection between the drive motor and the feeding lead screw is to provide overload protection for the spindle and tool during the feed stroke in the event either should encounter an unforeseen obstruction. Furthermore, the entire reaction of this overload clutch in its protection function is to temporarily interrupt further axial feeding motion being transmitted through the lead screw to the spindle and tool. In other words, upon the spindle or tool meeting an unforeseen obstruction during the feed stroke, an abnormal resistance to further feed stroke movement created by the obstruction is transmitted reversely through the lead screw and into the overload clutch causing actuation of the clutch to temporarily discontinue the transmission of rotational motion therethrough to the lead screw.

During maintainment of such unforeseen obstruction, the spindle and tool will continue to rotate through their independent connection to the drive motor, but the obstruction will retain the formerly rotating lead screw stationary as permitted by the disconnection of the clutch and the interruption of rotational motion to the lead screw from the drive motor. As soon as the obstruction is removed, thereby removing the abnormal resistance to feed stroke movement and removing the transmission of such resistance back through the lead screw and to the disengaged clutch, the then disengaged overload clutch will immediately re-engage properly transmitting rotational motion therethrough from the drive motor to the lead screw so as to resume normal functioning of the lead screw and the normal axial feeding motion of the spindle and tool. It is evident, therefore, that the sole function and the sole capabilities of the clutch in these prior tool feeding devices is the described overload protection function in most cases guarding the spindle and tool, as well as possibly the lead screw and nut feeding mechanism, against damage from the unexpected obstruction.

Obviously, with this type of clutch having solely the overload protecting capabilities as described, such clutch is independent of and completely isolated in the functioning sense from the remainder of the particular tool feeding device including any control mechanisms of the particular tool feeding device. For instance, if a workman is not immediately present to remove the unexpected obstruction or shut down operation of the tool feeding device when such obstruction is encountered by the spindle or tool and the clutch is actuated to disengaged position, the spindle and tool will continue to rotate without further axial feed motion and the clutch will remain disengaged. This condition will persist until positive action is taken by the worker. Furthermore, there are many occasions where it is either impossible to immediately find the obstruction or impossible to readily remove the same resulting in still further positive action being required by the workman to remove the tool or spindle from such obstruction prior to resumption of normal tool feeding device function, thereby increasing the work stoppage delays and adding further to the difficulties involved.

OBJECTS AND SUMMARY OF THE INVENTION

It is, therefore, an object of this invention to provide a tool feeding device having a unique signal controlling feed clutch incorporated therein which not only provides the overload protection of the similarly located clutches of the prior devices, but also through a positive motion provides a usable signal upon disengagement thereof which may be used in various manners to otherwise control the tool feeding device. In the preferred form of the present invention, the unique signal controlling feed clutch is preferably formed with at least one rotatable clutch member capable of transmitting prerdetermined maximum rotational forces therethrough in the engaged position, but moving axially to a disengaged position interrupting the transmission of rotation therethrough upon higher abnormal rotational forces created by a resistance to rotation being received. The clutch member is, in turn, connected for transmission of its axial movement to disengaged position into a cooperable signal means to actuate the signal means in a manner for use of such signal means in controlling other functioning of the tool feeding device. Thus, the unique clutch serves a dual function, overload protection and signal means actuation on an automatic basis.

It is a further object of this invention to provide a tool feeding device having the unique signal controlling feed clutch incorporated therein of the foregoing type wherein the clutch sensing or monitoring of the rotational forces therethrough in driving the tool feed mechanism and reacting with a positive axial movement to actuated signal means upon the detection of abnormal resistance to tool feed movement may be advantageously translated through the signal means into a control immediately terminating the tool feed stroke and immediately commencing the tool retraction stroke, thereby quickly removing the spindle and tool from the abnormal resistance causing obstruction and returning the tool to starting position until the obstruction can be removed. Again in the preferred form, the signal means may be a fluid controlling device controlling the direction of fluid to a control device which, in turn, controls the engagement and disengagement of the appropriate nuts with the axial feed motion producing lead screw, nut engagement producing such axial feed movement and disengagement interrupting such axial feed movement. During an axial feed stroke of the tool, therefore, upon a detection of obstruction by the clutch and movement thereof to the disengaged position actuating the fluid controlling valve, such fluid control will immediately through the control device move the then lead screw engaging nuts from such engagement to disengagement therefrom permitting the normal tool retraction stroke to commence and return the tool to its original start position.

It is still a further object of this invention to provide a tool feeding device having the unique signal controlling feed clutch adding the foregoing advantageous features, yet without requiring major reconstruction of the prior tool feeding devices so as to maintain the added expense at a minimum. The dual purpose overload protecting and signal producing clutch of the present invention may be installed in virtually the same space and location as the prior single purpose overload clutch, and due to the simplicity thereof, the expense of fabricating the clutch is approximately the same. With a slight alteration in the control mechanism for the nuts of the lead screw and nut assembly, the only additional components are the fluid controlling device and the fluid communication lines to the nut control device. Overall, therefore, only minor additional expense is created easily warranted by the advantageous increased control function provided thereby.

Other objects and advantages of the invention will be apparent from the following specification and the accompanying drawings which are for the purpose of illustration only.

BRIEF DESCRIPTION OF THE DRAWINGS

FIG. 6 is a vertical sectional view looking in the direction of the arrows 6—6 in FIG. 4;

FIG. 7 is a somewhat exploded view showing the details of the clutch members of the feed clutch of FIG. 4;

DESCRIPTION OF THE BEST EMBODIMENTS CONTEMPLATED

Figure 1:
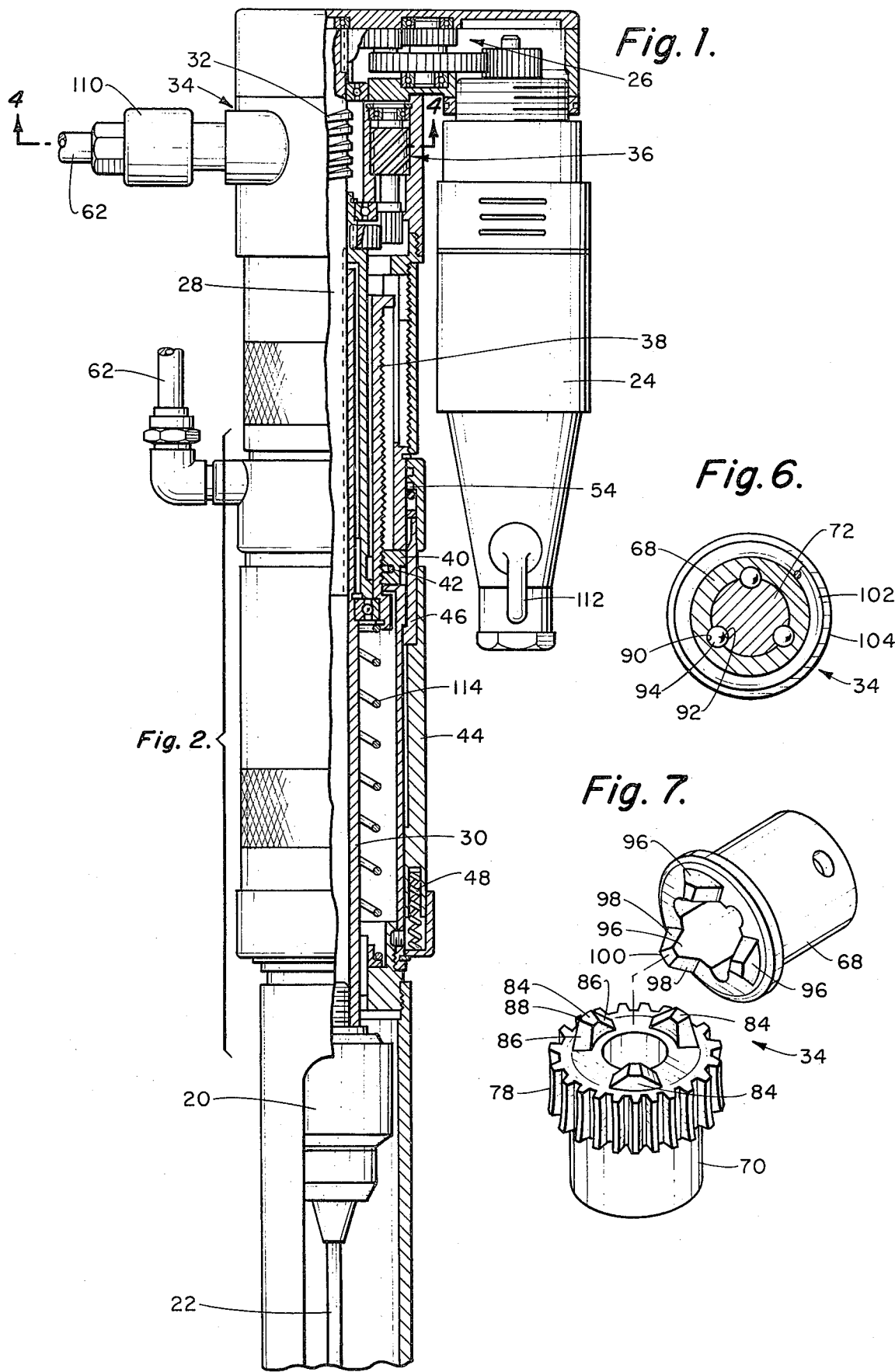
FIG. 1 is a fragmentary, side elevational view, partially broken away and in section, of a preferred embodiment of the tool feeding device incorporating the novel principals of the present invention, the tool feeding device being shown just commencing a tool feed stroke.

A preferred embodiment of a tool feeding device incorporating the novel principals of the present invention is illustrated in the drawings, in this particular instance, rotatably driving a tool chuck 20 having a drill bit 22 mounted therein. It is pointed out, however, that the tool feeding device of the present invention can be equally well used with other tools and the broader principals of the present invention can be equally well applied to other forms of tool feeding devices, all contemplated within the principals of the present invention. Furthermore, the tool feeding device illustrated and the various mechanisms thereof may be fabricated from usual materials and with usual manufacturing processes appropriate to provide the desired device and well known to those skilled in the art.

Specifically referring to FIG. 1, the illustrated tool feeding device includes a typical fluid actuated, preferably air actuated, drive motor 24 which is connected through a speed reducing, main drive gear train 26 for rotatably driving an axially stationary, first spindle part 28. The first spindle part 28 is, in turn, spline connected to a partially telescoping, axially reciprocal, second spindle part 30, the second spindle part having the tool chuck 20 and drill bit 22 operably secured to the lower end thereof in typical fashion and for rotation thereby. Therefore, rotation of the first spindle part 28 by the drive motor 24 rotates the second spindle part 30 and its tool chuck and drill bit 20 and 22, while permitting relative axial movement of the second spindle part with respect to the first spindle part in downward feed and upward retraction strokes from the position shown in FIGS. 1 and 2 starting the downward feed stroke and from the position shown in FIG. 3 approximately starting the retraction stroke.

Still referring to FIG. 1, a worm 32 is mounted spaced downwardly from and secured surrounding the first spindle part 28 and is operably connected through a novel feed drive clutch generally indicated at 34 to a feed drive train 36. The feed drive clutch 34 will be described hereinafter in detail, but for the moment, it is only necessary to state that the feed drive clutch transmits rotational motion therethrough from the worm 32 into and rotatably driving the feed drive train 36. The feed drive train 36 is, in turn, operably connected for rotatably driving a lead screw 38 also shown in FIGS. 2, 3, 8, and 9.

The lead screw 38 telescopes both the first spindle part 28 and in varying degrees during the working operations, the upper end of the second spindle part 30 and is rotatable relative to both. This lead screw 38 is, however, relatively rotatably secured to the second spindle part 30 for axial movement of the second spindle part exactly with and by the lead screw as shown. At approximately the lower end of the first spindle part 28, nuts 40 are mounted radially outwardly of the lead screw 38, such nuts being axially stationary but radially reciprocal between inward engaged positions threadably engaged with the lead screw 38 as shown in FIGS. 1, 2 and 8 and disengaged positions spaced radially outwardly of the lead screw as shown in FIGS. 3 and 9, the nuts normally being resiliently urged to their outer disengaged positions by an arcuate compression spring 42.

An axially reciprocal, cam control sleeve 44 is positioned radially outwardly telescoping the lower end of the first spindle part 28 and the upper end of the second spindle part 30, which cam control sleeve is upwardly secured to a nut cam sleeve 46. The cam control sleeve 44 has compression springs 48 engaged with the lower end thereof normally urging the cam control sleeve axially upwardly to, in turn, normally urge the nut cam sleeve 46 axially upwardly. The nut cam sleeve 46 radially outwardly telescopes the nuts 40 and is formed with radially inwardly facing cam surfaces 50 and relief pockets 52.

The upper end of the nut cam sleeve 46 at all times protrudes axially into a cam disengagement cylinder 54 and directly overlying this sleeve upper end within the cylinder is a guide sleeve 56. Also within the cylinder 54 and directly overlying the guide sleeve 56 is a resilient material sealing ring 58, preferably a resilient material O-ring. Finally, at the upper end of the cylinder 54 is an inlet 60 communicating outwardly with the lower end of a fluid supply tube 62.

Figure 2:
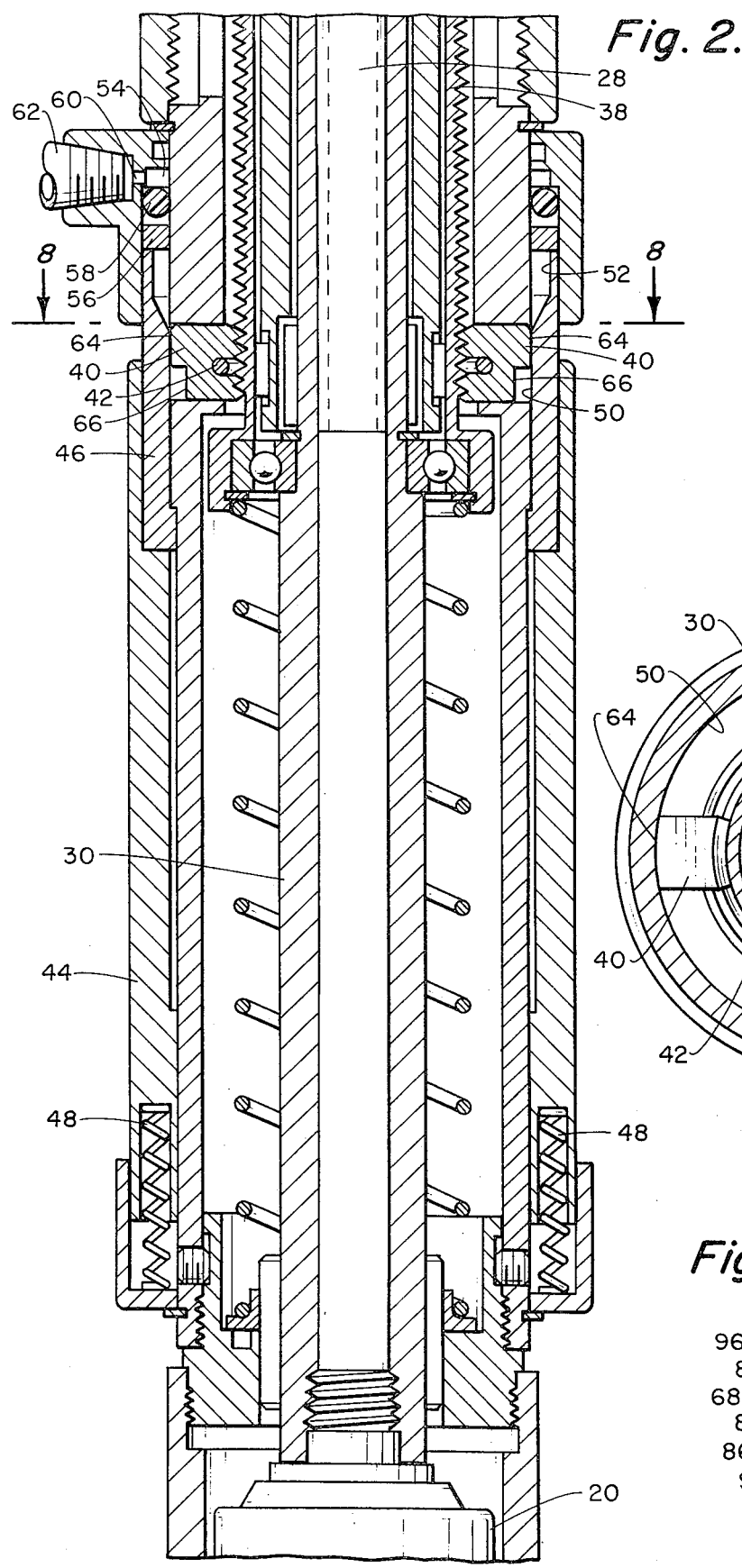
FIG. 2 is an enlarged, fragmentary, vertical sectional view of the lower portion of the tool feeding device of FIG. 1 showing the same stage of the tool feed stroke.
Figure 8:
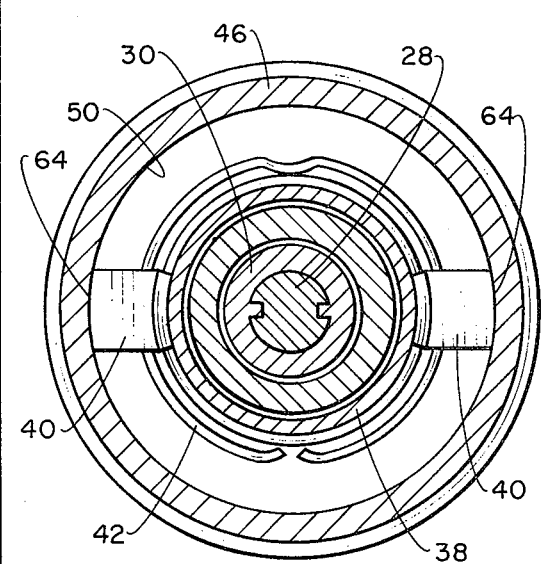
FIG. 8 is a horizontal sectional view looking in the direction of the arrows 8—8 in FIG. 2 and showing the nuts engaged with the lead screw for the spindle and tool feed stroke.
Figure 3:
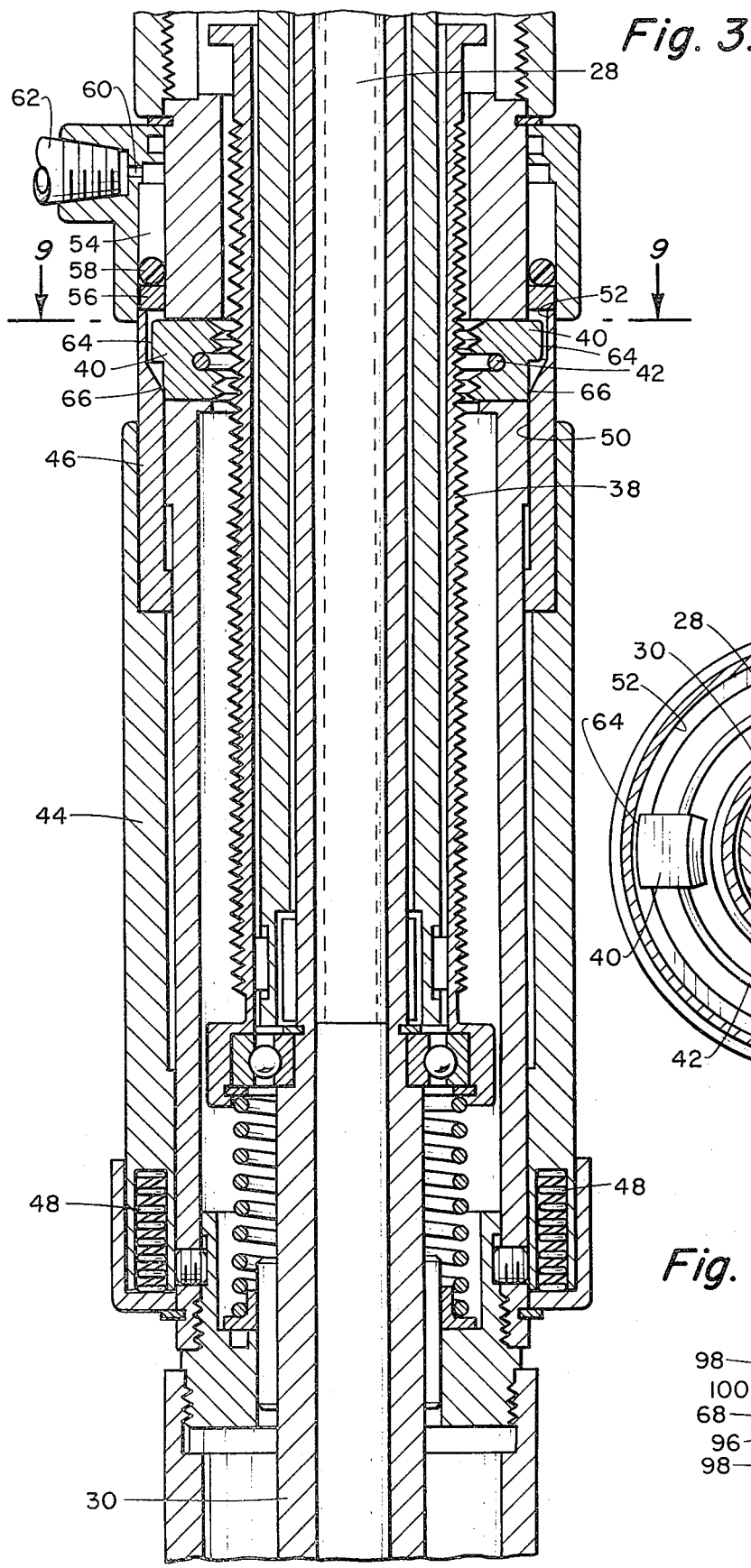
FIG. 3 is a view similar to FIG. 2, but showing the tool feeding device at approximately the start of the tool retraction stroke.
Figure 9:
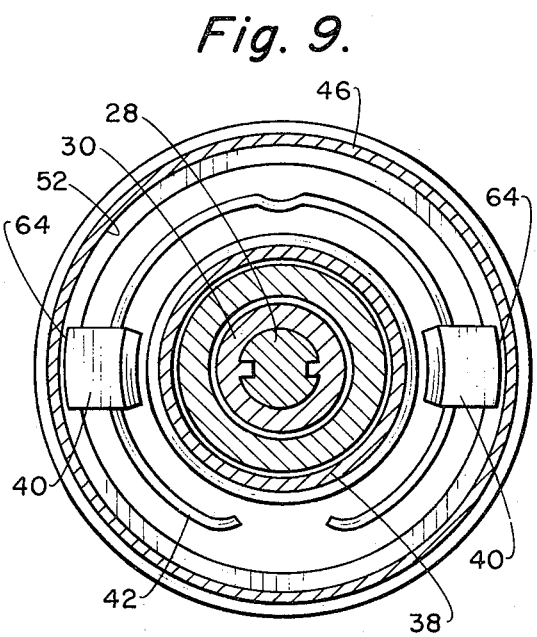
FIG. 9 is a view similar to FIG. 8 but showing the nuts disengaged from the lead screw for the spindle and tool retraction stroke.

Thus, with the supply tube 62 free of directing fluid, such as air, into the cam disengagement cylinder 54 as shown in FIGS. 1, 2, and 8, the springs 48 axially move the cam control sleeve 44 and the nut cam sleeve 46 axially upwardly so that the cam surfaces 50 of the nut cam sleeve engage the nuts 40 at engagement cam surfaces 64 thereof forcing the nuts radially inwardly and retaining the same in full engagement with the lead screw 38. When, however, pressurized air is directed through the fluid supply tube 62 into the cam disengagement cylinder 54, this forces the cam control sleeve 44 and nut cam sleeve 46 axially downwardly compressing the springs 48 as shown in FIGS. 3 and 9, permitting the nuts 40 to be received partially radially outwardly within the relief pockets 52 of the nut cam sleeve and disengagement cam surfaces 66 of the nuts 40 to engage the cam surfaces 50 as urged by the nut spring 42. The nuts 40 are thereby spaced radially outwardly of the lead screw 38 disengaged therefrom and the nuts are retained in this disengaged position by their spring 42 so long as pressurized air within the cam disengagement cylinder 54 retains the cam control and nut cam sleeves 44 and 46 axially downwardly.

Figure 4:
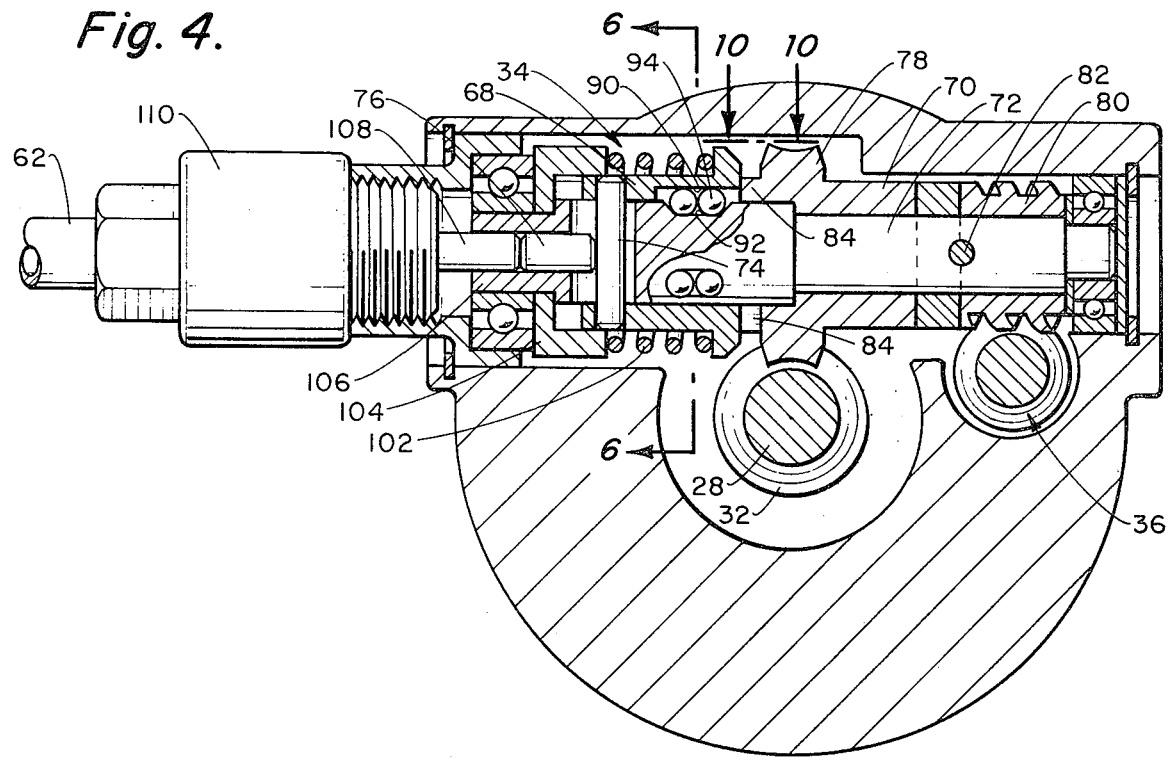
FIG. 4 is an enlarged, fragmentary, horizontal sectional view looking in the direction of the arrows 4—4 in FIG. 1 and showing the feed rotational force transmitting clutch means in engaged position with the signal means in its first control position.
Figure 5:
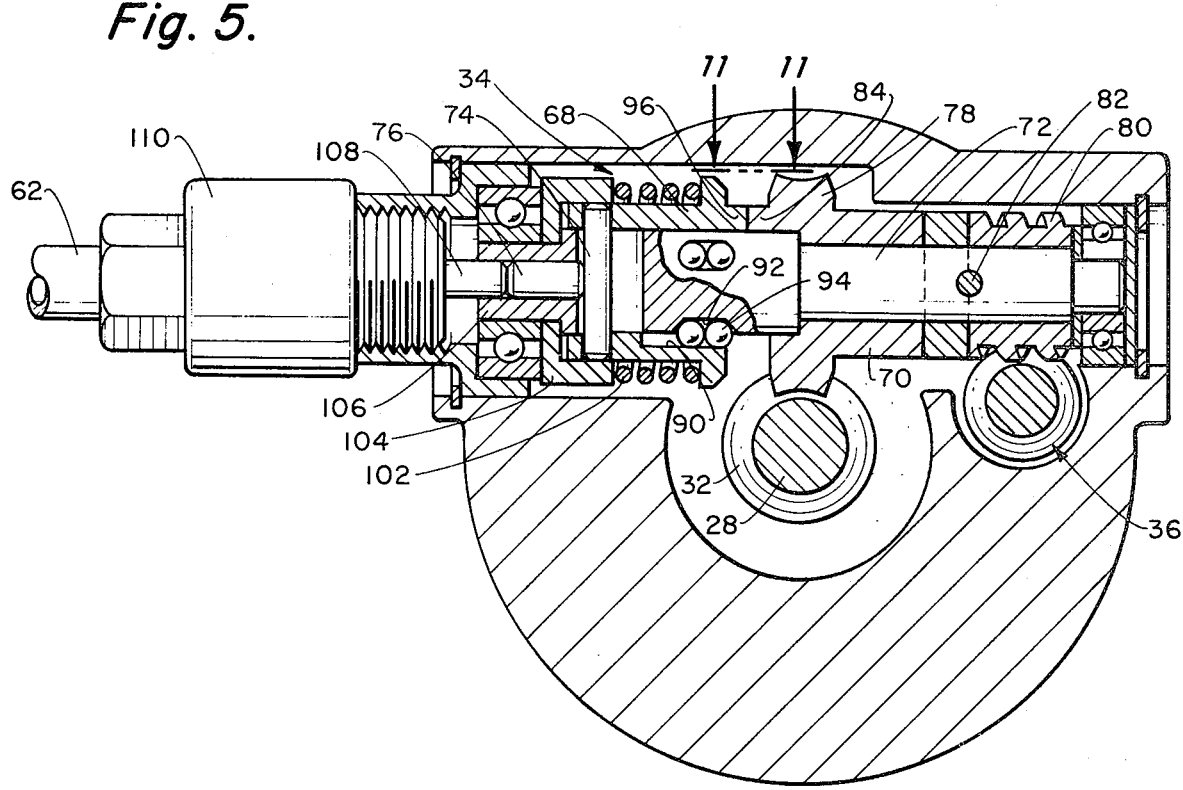
FIG. 5 is a view similar to FIG. 4 but showing the clutch means in disengaged position and the signal means in its second control position.

Referring more particularly to FIGS. 4 through 7, 10 and 11, the novel feed drive clutch 34 includes a first clutch member 68, a second clutch member 70, a clutch driven shaft 72, a diametrical thrust pin 74 and a reciprocal axial thrust pin 76. A worm wheel 78 is operably engaged with the worm 32 on the first spindle part 28, such worm wheel being secured, preferably integral, to the second clutch member 70 for transmission of rotatable motion or driven from the first spindle part into the feed drive clutch 34. The right end of the clutch driven shaft 72 as viewed in FIGS. 4 and 5 is telescoped by a worm gear 80 secured thereto by a pin 82, the worm gear transmitting rotational motion or drive from the feed drive clutch 34 into the feed drive train 36 with which it is operably engaged.

More particularly to the elements of the feed drive clutch 34, the second clutch member 70 is journaled on and telescoping an intermediate part of the clutch driven shaft 72 axially facing the first clutch member 68 as viewed. Three equally circumferentially spaced engagement members 84 are formed preferably integral on the left face of the second clutch member 70 with these engagement members each having oppositely angled sides 86 and axially facing, only slightly angled ends 88 as viewed radially in FIGS. 10 and 11. Although rotatable relative thereto, the second clutch member 70 is axially stationary on the clutch driven shaft 72.

The first clutch member 68 partially telescopes the left end of the clutch driven shaft 72 and is axially reciprocally, as well as drivingly connected to the clutch driven shaft 72 through clutch member axial slots 90 and shaft slots 92 having balls 94 engaged partially in each. As shown in FIG. 6, there are three sets of the clutch member and shaft slots 90 and 92 with the clutch member slots 90 extending greater axial distances than the shaft slots 92, the latter shaft slots axially confining the balls 94. Thus, with the balls 94 partially engaged in each of the clutch member slots 90 and shaft slots 92, these balls will transmit rotational motion or drive between the first clutch member 68 and the clutch driven shaft 72, while still permitting limited axial reciprocal motion of the first clutch member over the clutch drive shaft.

As is particularly well shown in FIG. 7, as well as seen in FIGS. 4, 5, 10 and 11 the right face of the first clutch member 68 as viewed in FIG. 4 is formed with three, equally circumferentially spaced engagement members 96 preferably integrally therewith formed similarly to the engagement members 84 of the second clutch member 70, that is, with oppositely angled sides 98 and only slightly angled ends 100. The engagement members 84 of the second clutch member 70 and the engagement members 96 of the first clutch member 68 are spaced and proportioned such that these engagement members will both axially and circumferentially, substantially fully interengage permitting the first clutch member 68 to move axially into an engaged position, engaged with the second clutch member 70 for the transmission of a normal rotational drive therebetween, the engaged position being shown in FIGS. 4 and 10 wherein circumferentially facing angled sides 86 and 98 abut. At the same time, upon a determined resistance to be hereinafter explained to such transmission of rotational drive, the engagement member angled sides 86 and 98 ride circumferentially and axially, one up the other, thereby forcing the first clutch member 68 to a disengaged position wherein the engagement member ends 88 and 100 temporarily abut and there is no capability of the first and second clutch members 68 and 70 to transmit rotational motion or drive therebetween. The first clutch member 68 is axially urged to the right as viewed in FIGS. 4 and 10 into engaged position by a compression retention spring 102 between the first clutch member 68 to the right and a spring positioning collar 104 to the left.

At the left, the clutch driven shaft 72 as viewed, mounts the diametrical thrust pin 74 in a slot thereof and centrally, this diametrical thrust pin 74 is abutted by the end of the axial thrust pin 76. This axial thrust pin 76 is axially reciprocally received within a pin collar 106 formed integrally on the clutch driven shaft 72 and which collar is spaced axially from the diametrical thrust pin 74. The pin collar also axially movably receives a valve operating shaft 108 of signal means, in this case, a typical fluid or air directing device such as a somewhat spool-type valve 110. The spool valve 110 or other device is of the usual form well known to those skilled in the art operable between set axial open and closed positions, that is, when in open position, it will remain in such open position until physically moved axial to its closed position and when in closed position, it will remain in such closed position until physically moved to its open position. The spool valve 110 is in closed position when to the right as shown in FIG. 4 blocking the transmission of air therethrough and is in open position when to the left as viewed in FIG. 5 transmitting air therethrough.

The spool valve 110 is connected in communication for transmitting air into the fluid supply tube 62 when in open position and, therefore, transmitting air to the previously described cam disengagement cylinder 54. Thus, in this installation, the spool valve 110 is movable from its closed right position as shown in FIG. 4 to its open left position as shown in FIG. 5 by the diametrical and axial thrust pins 74 and 76. In turn, the spool valve 110 may be moved from open position to the left as shown in FIG. 5 to closed position to the right as shown in FIG. 4 by the direction of actuating air under pressure into an appropriate chamber thereof (not shown) in the usual manner and supplied by operation of appropriate controls (not shown) all well known to those skilled in the art.

Figure 10:
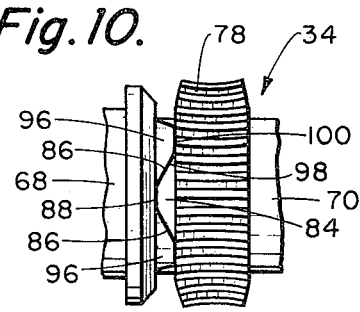
FIG. 10 is a fragmentary, horizontal sectional view looking in the direction of the arrows 10—10 in FIG. 4 and showing the clutch members of the clutch means of FIG. 4 in their engaged position.

Overall, the retention spring 102 of the feed drive clutch 34 is selected so that the first clutch member 68 is retained in engaged positioned with the second clutch member 70 during the transmission of a normal rotational force or drive therethrough from the drive motor 24 to the rotatably driving the lead screw 38 during a normal working feed stroke of the second spindle part 30, that is, during the normal performance of a working operation by the rotating tool chuck 20 and drill bit 22 unless or until an abnormal resistance to further feed stroke movement is encountered by the first spindle part. At this time, an abnormal thrust will be exerted upwardly through the second spindle part into the lead screw 38 causing an abnormal resistance to rotation thereof by resisting such further feed and into the feed drive clutch 34. Such force will overcome the retention of the first clutch member 68 in its engaged position as shown in FIGS. 4 and 10 by the retention spring 102 permitting the engagement members 96 of the first clutch member to ride axially up on the engagement members 84 of the second clutch member 70 moving the first clutch member to its disengaged position and ceasing the transmission of rotational motion through the feed drive clutch 34 as shown in FIGS. 5 and 11.

Such abnormal resistance to further feed movement in its feed stroke of the second spindle part 30 and/or its tool chuck 20 and drill bit 22 can be caused by some unforeseen obstruction or even a dull drill bit 22, either of which can cause the abnormal reverse thrust or resistance. Also, such abnormal reverse thrust or resistance may be deliberately created to deliberately cease a feed stroke at the determined end of a working operation such as by the second spindle part 30 or its tool chuck 20 axially moving against a preset collar (not shown). In any event, upon development of the abnormal reverse thrust or resistance to drive stroke movement, the feed drive clutch 34 will cause reversal of drive stroke movement into retraction stroke movement as will be hereinafter more particularly described.

In overall operation of the embodiment of the tool feeding device of the present invention, with the second spindle part 30 in its fully retracted position as shown in FIGS. 1 and 2 and with the feed drive clutch 34 engaged and the spool valve 110 closed or in non-air transmitting position as shown in FIG. 4, there will be no air in the cam disengagement cylinder 54 so that the cam control and nut cam sleeves 44 and 46 will be in their upper positions retaining the nuts 40 engaged with the lead screw 38. Starting of the drive motor 24 by movement of control lever 112 will, therefore, not only rotatably drive the first spindle part 28 rotating the second spindle part 30, tool chuck 20 and drill bit 22, but through the feed drive clutch 34, will begin rotation of the lead screw 38 relative to its engaged nuts 40 beginning the feed stroke. Assuming no unforeseen obstruction or dulling tool, the feed stroke and the working operation will be progressively carried out.

Figure 11:
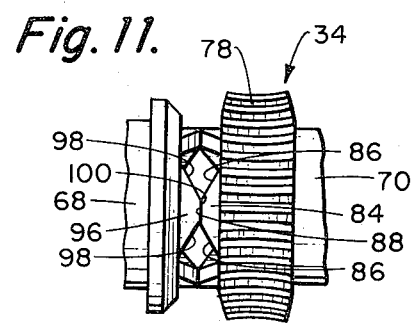
FIG. 11 is a view similar to FIG. 10 but showing the clutch members in their disengaged position.

At the intended end of the feed stroke or prior thereto if an unforeseen obstruction or a dulling tool is encountered, the abnormal reverse thrust will be created acting rearwardly through the second spindle part 30 and lead screw 38 into the feed drive clutch 34 causing the first clutch member 68 to move axially to its disengaged position as shown in FIGS. 5 and 11 axially moving the spool valve 110 to its open or air transmitting position. This will transmit air under pressure into the cam disengagement cylinder 54 forcing the cam control and nut cam sleeves 44 and 46 downwardly and permitting the nuts 40 to move radially outwardly to their disengaged positions as shown in FIGS. 3 and 9. Movement of the nuts 40 to their disengaged positions will axially release the lead screw 38 causing spindle retraction spring 114 to force the lead screw 38 upwardly in its retraction stroke carrying the second spindle part 30, tool chuck 20 and drill bit 22 which finally arrive back at fully retracted position.

Thus, according to the principals of the present invention, a tool feeding device is herein provided having a unique signal controlling feed clutch, the feed drive clutch 34 of the type hereinbefore described. This feed drive clutch 34 has the unique capabilities of normally transmitting normal feed drive rotational forces therethrough for providing relative rotation between the lead screw 38 and the nuts 40 for carrying out a normal spindle feed stroke. However, upon an abnormal reverse thrust being exerted resisting further feed stroke movement, whether by an intended obstruction such as a preset depth determining collar or some unexpected obstruction which could create such reverse thrust, the feed drive clutch 34, capable of sensing such abnormal reverse thrust, at least temporarily disengages and, at the same time, sends out a usable signal by axial movement of the first clutch member 68.

As herein illustrated, such usable signal of the feed drive clutch 34 upon sensing the abnormal reverse thrust may be advantageously used for directing air to reposition cam surfaces 50 of the nut cam sleeve 46 to immediately disengage the nuts 40 from the feeding motion lead screw 38 and thereby permit an immediate cessation of the feed stroke and commencement of the retraction stroke. This thereby eliminates any further feed stroke forces and movement so as to eliminate any possibility of damage to the various working components, and may likewise be used as the intended reversal of the feed stroke. It is apparent, however, that this usable signal generated by the sensing and automatic operation of the unique feed drive clutch 34 may be otherwise used, for instance, for the controlling of some exterior component to start such component operation or cessation of operation, or to display a discernible warning signal or warning alarm, or merely to completely shut down further operation of the tool feeding device until proper corrections could be made.

I claim:

1. In a tool feeding device for feeding a constantly rotating tool in feed and retraction strokes, said tool being of the type having cooperable lead screw and nuts operably connected moving said tool without regard to said tool constant rotation in said feed stroke during lead screw and nut relative rotation therebetween and at least permitting movement of said tool still without regard to said tool constant rotation in said retraction stroke upon lead screw and nut lack of relative rotation therebetween, the combination of: drive means operable for producing driving rotation; drive train means operably connected to said drive means and operably connected transmitting rotation to said lead screw and nut for producing said relative rotation in carrying out a normal tool feed stroke, said drive train means rotation transmission to said lead screw and nut being independant of any rotation transmission to said tool; rotatable clutch means in said drive train means operably connected transmitting normal rotational forces therethrough for said lead screw and nut relative rotation in said normal tool feed stroke and therefore normal tool axial feed thrust in said normal tool feed stroke, said clutch means comprising a rotatable clutch member automatically retained in an engaged position during said clutch means normal rotational force transmission and automatically moving axially to a disengaged position interrupting said clutch means normal rotational force transmission upon an abnormal axial thrust resistance to said normal tool feed stroke reacting reversely through said lead screw and nut to said clutch means tending to abnormally resist rotation transmission through said clutch means; signal means movable between first and second control positions operably connected to said clutch means moving from said first to said second control position upon said clutch member moving axially from said engaged to said disengaged position.

2. In a tool feeding device as defined in claim 1 in which said signal means is operably connected to said clutch member of said clutch means movable directly by said clutch member from said first to said second control position upon said clutch member moving axially from said engaged to said disengaged position.

3. In a tool feeding device as defined in claim 1 in which said signal means is operably connected to said clutch member of said clutch means movable axially directly by said clutch member from said first to said second control position upon said clutch member moving axially from said engaged to said disengaged position.

4. In a tool feeding device as defined in claim 1 in which fluid actuated control means is operably connected for controlling said lead screw and nut relative rotation and lack thereof; and in which said signal means includes a fluid directing means controlling fluid flow to said control means.

5. In a tool feeding device as defined in claim 1 in which fluid actuated control means is operably connected for controlling said lead screw and nut relative rotation and lack thereof; and in which said signal means includes a fluid directing means controlling fluid flow to said control means, said fluid directing means being operably connected to said clutch member of said clutch means movable directly by said clutch member from said signal means first to said second control position upon said clutch member moving axially from said engaged to said disengaged position.

6. In a tool feeding device as defined in claim 1 in which fluid actuated control means is operably connected for controlling said lead screw and nut relative rotation and lack thereof; and in which said signal means includes a fluid directing means controlling fluid flow to said control means, said fluid directing means being operably connected to said clutch member of said clutch means and being directly axially movable from said signal means first to said second control position upon said clutch member moving axially from said engaged to said disengaged position.

7. In a tool feeding device as defined in claim 1 in which said clutch member of said clutch means is a first rotatable clutch member and said clutch means includes a second rotatable clutch member axially facing said first clutch member, engagement means between said first and second clutch members engaged transmitting rotation between said clutch members in said first clutch member engaged position and moving said first clutch member axially to its disengaged position interrupting transmission of rotation between said clutch members upon said first clutch member being permitted to move to its disengaged position, retention means normally retaining said first clutch member in its engaged position during said clutch means normal rotational force transmission and permitting movement of said first clutch member axially to its disengaged position as forced by said engagement means upon said abnormal resistance to said normal tool feed stroke reacting reversely through said lead screw and nut to said clutch means.

8. In a tool feeding device as defined in claim 1 in which said clutch member of said clutch means is a first rotatable clutch member and said clutch means includes a second rotatable clutch member axially facing said first clutch member, engagement means generally axially between and projecting generally axially from each of said first and second clutch members having angled surfaces axially and circumferentially engaged transmitting rotation between said clutch member in said first clutch member engaged position, said engagement means angled surfaces riding one up on the other moving said clutch members axially apart and moving said first clutch member axially to its disengaged position interrupting transmission of rotation between said clutch members upon said first clutch member being permitted to move axially to its disengaged position, retention means normally retaining said first clutch member in its engaged position during said clutch means normal rotational force transmission and permitting movement of said first clutch member axially to its disengaged position as forced by said engagement means upon said abnormal resistance to said normal tool feed stroke reacting reversely through said lead screw and nut to said clutch means.

9. In a tool feeding device as defined in claim 1 in which said clutch member of said clutch means is a first rotatable clutch member and said clutch means includes a second rotatable clutch member axially facing said first clutch member, engagement means projecting generally axially from each of said clutch members generally axially between said clutch members having angled surfaces axially and circumferentially engaged transmitting rotation between said clutch members in said first clutch member engaged position, said engagement means angled surfaces riding up on each other moving said first clutch member axially to its disengaged position interrupting transmission of rotation between said clutch members upon said first clutch member being permitted to move axially away from its engaged position with said second clutch member and to its disengaged position, retention means including an axially reacting compression spring against said first clutch member normally retaining said first clutch member in its engaged position during said clutch means normal rotational force transmission and compressing permitting movement of said first clutch member axially to its disengaged position as forced by said engagement means upon said abnormal resistance to said normal tool feed stroke reacting reversely through said lead screw and nut to said clutch means.

10. In a tool feeding device as defined in claim 1 in which said clutch member of said clutch means includes a second rotatable clutch member axially facing said first clutch member, engagement means between said first and second clutch members engaged transmitting rotation between said clutch members in said first clutch member engaged position and moving said first clutch member axially to its disengaged portion interrupting transmission of rotation between said clutch members upon said first clutch member being permitted to move to its disengaged position, retention means normally retaining said first clutch member in its engaged position during said clutch means normal rotational force transmission and permitting movement of said first clutch member axially to its disengaged position as forced by said engagement means upon said abnormal resistance to said normal tool feed stroke reacting reversely through said lead screw and nut to said clutch means; and in which said signal means is operably connected to said first clutch member of said clutch means movable directly by said first clutch member from said first to said second control position upon said first clutch member moving axially from said engaged to said disengaged position.

11. In a tool feeding device as defined in claim 1 in which said clutch member of said clutch means is a first rotatable clutch member and said clutch means includes a second rotatable clutch member axially facing said first clutch member, engagement means generally axially between and projecting generally axially from each of said first and second clutch members having angled surfaces axially and circumferentially engaged transmitting rotation between said clutch members in said first clutch member engaged position, said engagement angled surfaces riding one up on the other moving said clutch members axially apart and moving said first clutch member axially to its disengaged position interrupting transmission of rotation between said clutch members upon said first clutch member being permitted to move axially to its disengaged position, retention means normally retaining said first clutch member in its engaged position during said clutch means normal rotational force transmission and permitting movement of said first clutch member axially to its disengaged position as forced by said engagement means upon said abnormal resistance to said normal tool feed stroke reacting reversely through said lead screw and nut to said clutch means; and in which said signal means is operably connected to said first clutch member of said clutch means movable axially directly by said first clutch member from said first to said second control position upon said first clutch member moving axially from said engaged to said disengaged position.

12. In a tool feeding device as defined in claim 1 in which said clutch member of said clutch means is a first rotatable clutch member and said clutch means includes a second rotatable clutch member axially facing said first clutch member, engagement means projecting generally axially from each of said clutch members generally axially between said clutch members having angled surfaces axially and circumferentially engaged transmitting rotation between said clutch members in said first clutch member engaged position, said engagement means angled surfaces riding up on each other moving said first clutch member axially to its disengaged position interrupting transmission of rotation between said clutch members upon said first clutch member being permitted to move axially away from its engaged position with said second clutch member and to its disengaged position, retention means including an axially reacting compression spring against said first clutch member normally retaining said first clutch member in its engaged position during said clutch means normal rotational force transmission and compressing permitting movement of said first clutch member axially to its disengaged position as forced by said engagement means upon said abnormal resistance to said normal tool feed stroke reacting reversely through said lead screw and nut to said clutch means; in which fluid actuated control means is operably connected for engaging and disengaging said nuts from said lead screw; and in which said signal means includes a fluid directing means controlling fluid flow to said control means, said means being operably connected to said first clutch member of said clutch means movable axially directly by said first clutch member from said signal means first to said second control position upon said first clutch member moving axially from said engaged to said disengaged position.

13. In a tool feeding device as defined in claim 1 in which fluid actuated control means is operably connected for engaging and disengaging said nuts from said lead screw, said control means including cam means acting against said nuts and movable between nut engaged and disengaged positions, fluid cylinder means for urging said cam means between its positions; and in which said signal means includes a fluid directing means controlling fluid flow to said fluid cylinder means of said control means.

14. In a tool feeding device as defined in claim 1 in which said clutch member of said clutch means is a first rotatable clutch member and said clutch means includes a second rotatable clutch member axially facing said first clutch member, engagement means between said first and second clutch members engaged transmitting rotation between said clutch members in said first clutch member engaged position and moving said first clutch member axially to its disengaged position interrupting transmission of rotation between said clutch members upon said first clutch member being permitted to move to its disengaged position, retention means normally retaining said first clutch member in its engaged position during said clutch means normal rotational force transmission and permitting movement of said first clutch member axially to its disengaged position as forced by said engagement means upon said abnormal resistance to said normal tool feed stroke reacting reversely through said lead screw and nut to said clutch means; in which fluid actuated control means is operably connected for engaging and disengaging said nuts from said lead screw, said control means including cam means acting against said nuts and movable between nut disengaged positions, fluid cylinder means for urging said cam means between its positions; and in which said signal means includes a fluid directing means controlling fluid flow to said fluid cylinder means of said control means.

15. In a tool feeding device as defined in claim 1 in which said clutch member of said clutch means is a first rotatable clutch member and said clutch means includes a second rotatable clutch member axially facing said first clutch member, engagement means generally axially between and projecting generally axially from each of said first and second clutch members having angled surfaces axially and circumferentially engaged transmitting rotation between said clutch members in said first clutch member engaged position, said engagement means angled surfaces riding one up on the other moving said clutch members axially apart and moving said first clutch member axially to its disengaged position interrupting transmission of rotation between said clutch members upon said first clutch member being permitted to move axially to its disengaged position, retention means normally retaining said first clutch member in its engaged position during said clutch means normal rotational force transmission and permitting movement of said first clutch member axially to its disengaged position as forced by said engagement means upon said abnormal resistance to said normal tool feed stroke reacting reversely through said lead screw and nut to said clutch means; in which fluid actuated control means is operably connected for engaging and disengaging said nuts from said lead screw, said control means including cam means acting against said nuts and movable between nut engaged and disengaged positions, fluid cylinder means for urging said cam means between its positions; and in which said signal means includes a fluid directing means controlling fluid flow to said fluid cylinder means of said control means.

16. In a tool feeding device as defined in claim 1 in which said clutch member of said clutch means is a first rotatable clutch member and said clutch means includes a second rotatable clutch member axially facing said first clutch member, engagement means projecting generally axially from each of said clutch members generally axially between said clutch members having angled surfaces axially and circumferentially engaged transmitting rotation between said clutch members in said first clutch member engaged position, said engagement means angled surfaces riding up on each other moving said first clutch member axially to its disengaged position interrupting transmission of rotation between said clutch members upon said first clutch member being permitted to move axially away from its engaged position with said second clutch member and to its disengaged position, retention means including an axially reacting compression spring against said first clutch member normally retaining said first clutch member in its engaged position during said clutch means normal rotational force transmission and compressing permitting movement of said first clutch member axially to its disengaged position as forced by said engagement means upon said abnormal resistance to said normal tool feed stroke reacting reversely through said lead screw and nut to said clutch means; in which fluid actuated control means is operably connected for engaging and disengaging said nuts from said lead screw, said control means including cam means acting against said nuts and movable between nut engaged and disengaged positions, fluid cylinder means for urging said cam means between its positions; and in which said signal means includes a fluid directing means controlling fluid flow to said fluid cylinder means of said control means.

* * * * *